(12) United States Patent
Barth

(10) Patent No.: US 11,661,561 B2
(45) Date of Patent: May 30, 2023

(54) CARDBOARD STRUCTURE FOR FORMING A CHIMNEY STARTER

(71) Applicant: SJB PATENT HOLDINGS LLC, Houston, TX (US)

(72) Inventor: Stephen J. Barth, Houston, TX (US)

(*) Notice: Subject to any disclaimer, the term of this patent is extended or adjusted under 35 U.S.C. 154(b) by 61 days.

(21) Appl. No.: 17/337,740

(22) Filed: Jun. 3, 2021

(65) Prior Publication Data

US 2021/0380896 A1 Dec. 9, 2021

Related U.S. Application Data

(60) Provisional application No. 63/035,028, filed on Jun. 5, 2020.

(51) Int. Cl.
| | |
|---|---|
| *C10L 11/04* | (2006.01) |
| *C10L 11/06* | (2006.01) |
| *A47J 37/07* | (2006.01) |
| *B31B 50/78* | (2017.01) |
| *B31B 50/73* | (2017.01) |

(52) U.S. Cl.
CPC .............. *C10L 11/04* (2013.01); *C10L 11/06* (2013.01); *A47J 37/079* (2013.01); *B31B 50/732* (2017.08); *B31B 50/784* (2017.08); *C10L 2200/0469* (2013.01); *C10L 2230/06* (2013.01); *C10L 2270/08* (2013.01)

(58) Field of Classification Search
CPC ...... C10L 11/04; C10L 11/06; C10L 2270/08; C10L 2200/0469; C10L 2230/06; A47J 37/079; B31B 50/784; B31B 50/732
See application file for complete search history.

(56) References Cited

U.S. PATENT DOCUMENTS 6,328,028 B1 * 12/2001 Cayse .................. A47J 37/079
126/25 B

* cited by examiner

*Primary Examiner* — Cephia D Toomer
(74) *Attorney, Agent, or Firm* — Jeffrey Streets; Madan Law PLLC

(57) ABSTRACT

A cardboard structure is foldable to form a consumable chimney. The cardboard structure comprises four side wall panels that are connected to each adjacent side wall panel by a longitudinal fold line. The cardboard structure further comprises four floor panels that are each connected to the one of the side wall panels by a lateral fold line. Two locking floor panels secure the floor panels in place to form a floor extending inward from the side wall panels and form a central opening in the floor. The cardboard structure may be formed into an assembled chimney by a few simple folding operations. The cardboard chimney then supports the burning of an accelerant, such as newsprint, which then ignites a solid fuel source, such as charcoal, that is received in the chimney.

20 Claims, 8 Drawing Sheets

CARDBOARD STRUCTURE FOR FORMING A CHIMNEY STARTER

CROSS-REFERENCE TO RELATED APPLICATIONS

This application is a nonprovisional patent application claiming the benefit of U.S. provisional patent application Ser. No. 63/035,028 filed on Jun. 5, 2020, which application is incorporated by reference herein in its entirety.

BACKGROUND

The present disclosure relates to a chimney starter.

Background of the Related Art

A chimney starter is a device that is used to ignite lump charcoal, charcoal briquettes, wood chunks and sticks, or other source of solid fuel. A chimney starter is typically made with steel in the form of a cylinder. The cylinder supports a horizontal grate to support the source of fuel and may include holes or slits around the side of the cylinder above and below the grate to enable air flow through the grate and the source of fuel. Newspaper placed within the cylinder under the grate is ignited such that the fire rises through the grate to ignite the source of fuel.

One problem with chimney starters is that the burning fuel must eventually be dumped into a grill where a cooking grate is then placed over the burning fuel to directly support food or a pan containing the food. The burning fuel is extremely hot and the high thermal conductivity of the steel chimney starter makes the entire steel chimney very hot and difficult to dump. While a thermally insulated handle or glove makes it possible to hold the steel chimney for a short period of time, the action of dumping the burning fuel into a grill can cause hot particles to fly off. The user's hand is also above the area where the burning fuel is being dumped, such that heat from the burning fuel rises directly across the hand and arm. A long handle may remove the user's hand a short distance from the heat, but a long handle makes the chimney starter more difficult to dump and requires greater strength. Additionally, a chimney that is fully loaded with charcoal may weighs several pounds, and the lifting, turning and dumping of burning fuel from the chimney can be unwieldy and it may be difficult to direct the dumping of the fuel to the desired place in the grill.

A chimney starter is a helpful grilling tool, but it may become covered in soot and grime over multiple uses and may require significant effort to clean. Furthermore, a user may not have a chimney starter with them every time that they might decide to grill, such as on vacation or at a park, beach or friend's backyard. If a chimney starter is left exposed to weather elements, the chimney will rust and potentially stain surfaces. Over time, a chimney starter may also deteriorate and become dangerous in its use.

BRIEF SUMMARY

Some embodiments provide a cardboard blank for forming a chimney. The cardboard blank comprises a first side wall panel, a second side wall panel connected to the first side wall panel by a first longitudinal fold line, a third side wall panel connected to the second side wall panel by a second longitudinal fold line, a fourth side wall panel connected to the third side wall panel by a third longitudinal fold line, and a wall attachment tab connected to a selected one the first and fourth side wall panels by a fourth longitudinal fold line, wherein the wall attachment tab is connectable to the other of the first and fourth side wall panels. The cardboard blank further comprises a first floor panel connected to the first side wall panel by a first lateral fold line, wherein the first floor panel has a cutout a spaced distance from the first lateral fold line; a second floor panel connected to the second side wall panel by a second lateral fold line, wherein the second side wall panel includes a first aperture above the second lateral fold line for receiving a first locking tab; a first locking floor panel connected to the second floor panel by a first secondary fold line, wherein the first locking floor panel has a distal end forming the first locking tab; a third floor panel connected to the third side wall panel by a third lateral fold line, wherein the third floor panel has a cutout a spaced distance from the third lateral fold line; a fourth floor panel connected to the fourth side wall panel by a fourth lateral fold line, wherein the fourth side wall panel includes a second aperture above the fourth lateral fold line for receiving a second locking tab; and a second locking floor panel connected to the fourth floor panel by a second secondary fold line, wherein the second locking floor panel has a distal end forming the second locking tab.

Some embodiments provide a cardboard structure that is foldable to form a chimney. The cardboard structure comprises a first side wall panel, a second side wall panel connected to the first side wall panel by a first longitudinal fold line, a third side wall panel connected to the second side wall panel by a second longitudinal fold line, a fourth side wall panel connected to the third side wall panel by a third longitudinal fold line and connected to the first side wall panel by a fourth longitudinal fold line. The cardboard structure further comprises a first floor panel connected to the first side wall panel by a first lateral fold line, wherein the first floor panel has a cutout a spaced distance from the first lateral fold line; a second floor panel connected to the second side wall panel by a second lateral fold line, wherein the second side wall panel includes a first aperture above the second lateral fold line for receiving a first locking tab; a first locking floor panel connected to the second floor panel by a first secondary fold line, wherein the first locking floor panel has a distal end forming the first locking tab; a third floor panel connected to the third side wall panel by a third lateral fold line, wherein the third floor panel has a cutout a spaced distance from the third lateral fold line; a fourth floor panel connected to the fourth side wall panel by a fourth lateral fold line, wherein the fourth side wall panel includes a second aperture above the fourth lateral fold line for receiving a second locking tab; and a second locking floor panel connected to the fourth floor panel by a second secondary fold line, wherein the second locking floor panel has a distal end forming the second locking tab, and wherein a first connected pair of the side wall panels is laid generally flat against a second connected pair of the side wall panels.

Some embodiments provide a kit for assembling a cardboard chimney. The kit may comprise a cardboard structure that is foldable to form a cardboard chimney according to any of the embodiments described herein, and a cardboard divider receivable within the perimeter of the assembled cardboard chimney according to any of the embodiments described herein. In one option, the kit may further comprise an accelerant, such as a flammable piece of paper that is suitable for wadding and then placing the wadded paper into a central opening formed between the floor panels of the assembled cardboard chimney.

Some embodiments provide an apparatus comprising a cardboard chimney having a fully assembled configuration according to any of the embodiments disclosed herein. The apparatus may comprise a cardboard chimney defined by four side wall panels, an open top, a floor extending inward from the side wall panels leaving a central opening in the floor, and a set of feet that elevate the floor. Optionally, the cardboard chimney may further include one or more dividers according to any of the embodiments disclosed herein, such as a divider forming multiple compartments within the space between the side wall panels.

DETAILED DESCRIPTION

Figure 1:
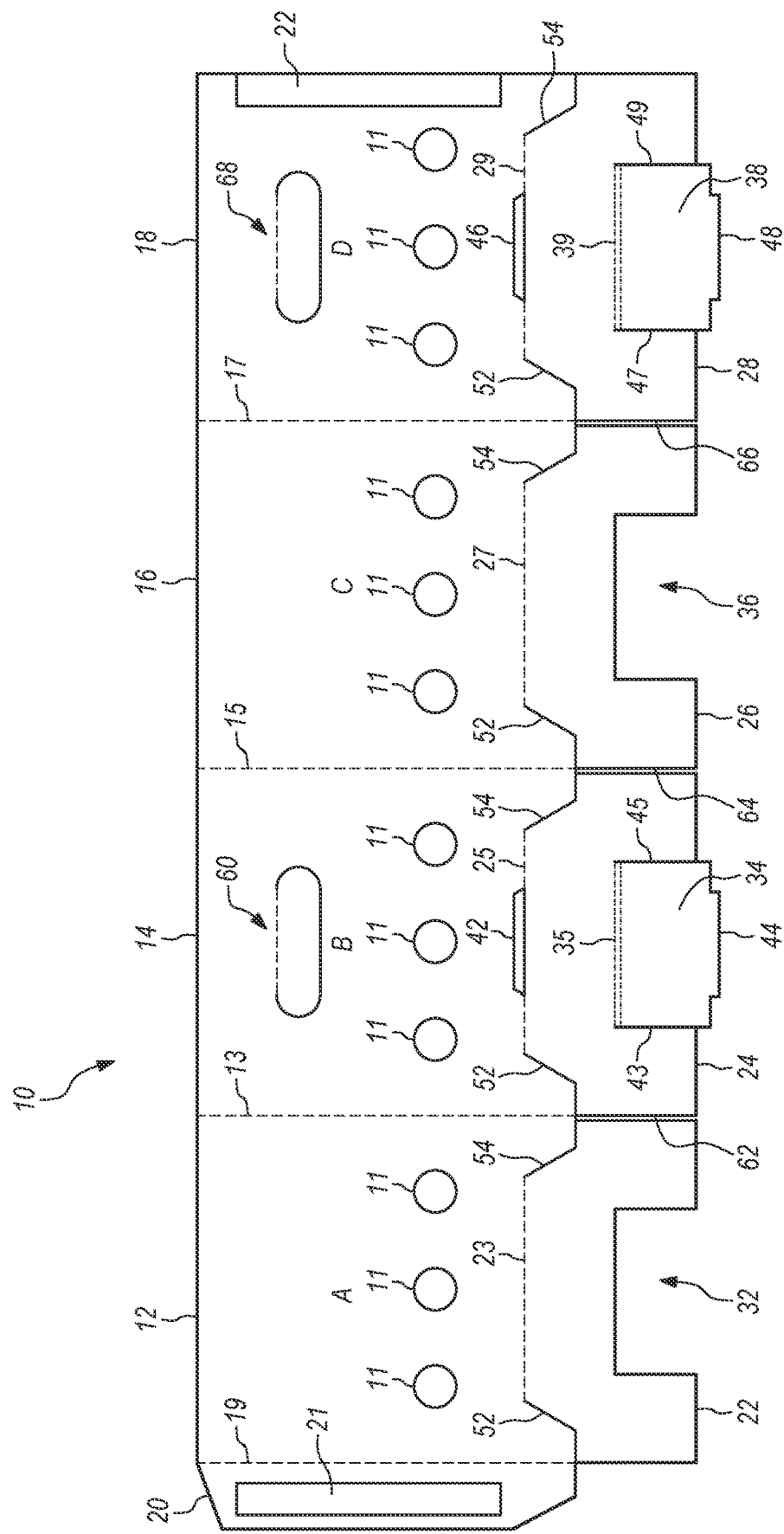
FIG. 1 is a plan view of a cardboard blank.

Some embodiments provide a cardboard blank for forming a chimney. The cardboard blank comprises a first side wall panel, a second side wall panel connected to the first side wall panel by a first longitudinal fold line, a third side wall panel connected to the second side wall panel by a second longitudinal fold line, a fourth side wall panel connected to the third side wall panel by a third longitudinal fold line, and a wall attachment tab connected to a selected one the first and fourth side wall panels by a fourth longitudinal fold line, wherein the wall attachment tab is connectable to the other of the first and fourth side wall panels. The cardboard blank further comprises a first floor panel connected to the first side wall panel by a first lateral fold line, wherein the first floor panel has a cutout a spaced distance from the first lateral fold line; a second floor panel connected to the second side wall panel by a second lateral fold line, wherein the second side wall panel includes a first aperture above the second lateral fold line for receiving a first locking tab; a first locking floor panel connected to the second floor panel by a first secondary fold line, wherein the first locking floor panel has a distal end forming the first locking tab; a third floor panel connected to the third side wall panel by a third lateral fold line, wherein the third floor panel has a cutout a spaced distance from the third lateral fold line; a fourth floor panel connected to the fourth side wall panel by a fourth lateral fold line, wherein the fourth side wall panel includes a second aperture above the fourth lateral fold line for receiving a second locking tab; and a second locking floor panel connected to the fourth floor panel by a second secondary fold line, wherein the second locking floor panel has a distal end forming the second locking tab.

For ease of description, two primary directions of the cardboard blank in a flattened state may be designated as "longitudinal" (up and down as seen in the Figures) and "lateral" (side to side as seen in the Figures). When referring to the assembled chimney in an operable (upright) orientation with its base or feet set on a support surface and the open top directed upward, the term "vertical" may be used as being synonymous with "longitudinal" and the term "horizontal" may be used as being synonymous with "lateral". It should also be recognized that the "lateral" directions, in reference to a flat blank, may be the same directions for each of the panels. However, upon folding the blank, such as folding the side wall panels into a rectangular perimeter, the "lateral" directions may be specific to a given panel since a given panel may be perpendicular to an adjacent panel. Generally, the term "lateral" used in reference to a given panel refers to a lateral direction as viewed facing the given panel as if the panel was in a flat blank. Any reference to front, back, left and right sides or directions is only for convenience of description, since the resulting consumable chimney may be used in any direction. In embodiments that fold so that the side wall panels form a rectangular perimeter, the lateral dimensions of the front and back panels may be substantially equal and the lateral dimensions of the first and second side panels may be substantially equal. Optionally, all four of the side wall panels (front, back, left and right) may have substantially equal dimensions.

Cardboard is a generic term for heavy-duty paper-based products having a greater thickness and superior durability or other specific mechanical attributes than paper, such as foldability, rigidity and impact resistance. The construction of cardboard can range from a thick sheet known as paperboard to corrugated fiberboard which is made of multiple corrugated and flat layers. Corrugated fiberboard may include numerous parallel, open channels that are referred to as flutes. Some embodiments of the cardboard blank may be made with cardboard that is substantially free from oils, plastic impregnating agents, sizing agents or other additives that would not burn cleanly or might produce hazardous by products. The cardboard is preferably fully combustible. Optionally, the cardboard may be new and/or recycled material of any thickness or grade. Some embodiments of the cardboard chimney may provide a solution to the problems with prior art chimneys by being inexpensive so that a user may purchase multiple cardboard chimneys, being compact and quickly assembled so that a user may keep a cardboard chimney stored in many places where it might be needed, being combustible to reliably and quickly allow fire to spread throughout the fuel source, and including no metal components so that a user does not need to clean any part of the chimney after use.

The cardboard blank is pre-slit and pre-scored to facilitate manual folding of the cardboard panels to assemble the chimney. A "fold line" (also referred to as a "score line") is a line that has been compressed in thickness, or otherwise made less rigid, to create a line of folding weakness along the surface of the blank. Accordingly, a fold line facilitates folding along the line, yet maintains a connection between the cardboard on either side of the line. For embodiments made with corrugated fiberboard, the fold lines may run parallel to the flutes, perpendicular to the flutes, or at various other angles to the flutes. A "secondary fold line" (also referred to as a "secondary score line") is a line that has been compressed in thickness, or otherwise made less rigid, to create a line of folding weakness along the surface of the blank. A secondary fold line is distinct from other fold lines in that the secondary fold line enables folding of a panel (i.e., a secondary panel) relative to another panel (i.e., a primary panel) that is already foldable about another folding line (i.e., a primary fold line).

A slit is a complete cut through the thickness of the cardboard either continuously or intermittently along a path, such as a fold line and/or along any other part of the cardboard blank disclosed herein. A continuous slit removes all connection between two adjacent panels or areas of cardboard on either side of the continuous slit, whereas intermittent slits (or perforations) allow two adjacent panels or areas of cardboard to remain connected yet are easily manually separable along the path of the intermittent slits (i.e., a tear line). It should be recognized that intermittent slits may be used to temporarily maintain a connection between two cardboard panels or blanks, or may be used to provide an optional feature. Accordingly, intermittent slits allow a user to choose if and/or when to separate the cardboard along the path of the intermittent slits. Score lines are typically straight, either longitudinal or lateral. However, a slit or a set of intermittent slits may follow any path or direction, including longitudinal, lateral, angled relative to longitudinal or lateral, or curved, and may form any shape, such as a circle or rectangle. In some embodiments made with corrugated cardboard, the cardboard blank is preferably cut so that the flutes will extend in the longitudinal direction of the sidewalls.

During manufacture of a cardboard blank, automated machinery may form score lines in a piece of cardboard and cut the piece of cardboard to a desired shape and size while forming additional slits and holes. If the cardboard blank is to be folded and glued, the automated machinery may also apply glue and press particular cardboard panels and/or tabs together to form a connection.

In some embodiments, the wall attachment tab is connected to the first side wall panel by a fourth longitudinal fold line, wherein the wall attachment tab is connectable to the fourth side wall panel. Once connected, the four wall panels may be expanded (folded out) to form a continuous perimeter, preferably having a rectangular cross-section. In some embodiments, the wall attachment tab is connected to the fourth side wall panel by a fourth longitudinal fold line, wherein the wall attachment tab is connectable to the first side wall panel. In either of these embodiments, the result is that the first and fourth side wall panels are connectable along the fourth longitudinal fold line. However, it should be recognized that the wall attachment tab of the cardboard blank may be connected to one side of either a wall panel that is connected to a floor panel (alone) or a wall panel that is connected to a floor panel that is itself further connected to a locking floor panel. While the locking floor panels should be connected to alternating side wall panels (via a floor panel) so that the locking floor panels are on opposing sides of an assembled chimney, it does not matter whether the wall attachment tab is connected to the left or right of any particular wall panel. In some embodiments, the cardboard blank may include an adhesive strip covered by a release liner strip, wherein the adhesive strip is applied to the wall tab and/or the fourth side wall panel for securing the wall tab to the fourth side wall panel. By removing the release liner strip, the adhesive is exposed and may be pressed between the wall tab and fourth side wall panel. In another embodiment, the cardboard blank may have a fourth wall that includes at least one slit for securely receiving at least one portion of the tab. Optionally, such a tab may be narrow and have a distal head that resists pulling back out of the slit.

Each of the floor panels is connected to a corresponding wall panel by a lateral fold line. One set of alternating floor panels of the cardboard blank (opposing floor panels of the assembled chimney), such as the first and third floor panels, preferably each have a cutout a spaced distance from the lateral fold line. While the floor panels collectively form a floor within the assembled chimney, the cutouts in the floor panels may define part of a central opening in the floor of the assembled chimney. Accordingly, the size, shape and location of the cutouts may have an effect on the size, shape and location of the central opening in the floor of the assembled chimney. Furthermore, the first and third floor panels preferably have sufficient length to extend at least far enough to be engaged by the first and second locking floor panels. For example, when the first and third floor panels are folded inwardly (toward a center of the assembled chimney) to a perpendicular angle with the first and third side wall panels, the floor panels may extend at least far enough to be engaged by the first and second locking floor panels. For example, the floor panels may extend completely to the opposing side wall panel so long as the floor panels can still be folded to a perpendicular angle with the first and third side wall panels. In some embodiments, the floor panels each extend about half-way between the first and third side wall panels when folded to a perpendicular angle with the first and third side wall panels, such that the first and third floor panels do not overlap, yet leave only a minor gap. In some embodiments, one or more of the floor panels may have the cutout formed in a distal end of the floor panel (i.e., the floor panel opens outwardly). In some embodiments, one or more of the floor panels may extend far enough between the first and third side panels to encompass the entire central opening, such that the cutout is an internal cutout within the one or more floor panel.

Another set of alternating floor panels of the cardboard blank (opposing floor panels of the assembled chimney), such as the second and fourth floor panels, are each adjacent to an aperture (i.e., a first aperture and a second aperture, respectively) formed in a side wall panel above or along the second and fourth lateral fold line, respectively, for receiving a locking tab (i.e., a first locking tab and a second locking tab). For example, each aperture may be a laterally elongate slot having a longitudinal height that may be between one to three times the thickness of the cardboard, and the locking tab may have a lateral dimension and shape that is complimentary to the lateral dimension of the aperture, such that the locking tab will fit snuggly within the aperture when inserted into the aperture. Most preferably, the locking tab may require an intentional manual force to temporarily overcome the nature rigidity of the cardboard so that the locking tab will snap into the aperture. The locking tab should remain securely within the aperture under normal conditions of using the assembled chimney, such as under the load of a fuel source within the chimney and reasonable handling of the loaded chimney.

The first locking floor panel is connected to the second floor panel by a first secondary fold line. A distal end of the first locking floor panel forms the first locking tab, as described above. The distance between the second fold line (connecting the second floor panel to the second side wall panel) and the first secondary fold line (connecting the first locking floor panel to the second floor panel) may be substantially equal to the distance between a base of the first locking tab and the first secondary fold line, such that the first locking tab can be inserted into the first aperture when the second floor panel is folded inward to a position perpendicular to the second side wall panel and the first locking floor panel is then folded upward and then outwardly to a position parallel to the second floor panel. In some embodiments, the second floor panel may extend under one or more of the first and third side panels and the first locking floor panel may extend over the one or more of the first and third side panels. Accordingly, the first secondary fold line may be a compound fold line, meaning that the first secondary fold line may have two closely spaced apart parallel fold lines, where the two fold lines are spaced apart by a distance that facilitates folding over or around an edge of the one or more of the first and third side panels. More specifically, if there is one thickness of cardboard to be received between the second floor panel and the first locking floor panel, then the distance between the two fold lines of the compound fold line may be a function of the thickness of the one sheet of cardboard. Some embodiments may secure the first and third floor panels between the second floor panel and the first locking floor panel, yet if the first and third floor panels do not overlap then this is the equivalent of only one thickness of the cardboard. However, if there are overlapping cardboard sheets (i.e., multiple cardboard thicknesses) between the second floor panel and the first locking floor panel, then the distance between the two fold lines of the compound fold line should be adjusted as a function of the total thickness of cardboard received there between. Still further, the longitudinal dimension of the first aperture may also be adjusted to account for the number of cardboard thicknesses received there between so that the first locking tab will align with the first aperture after the first locking floor panel has been folded over the thickness of the cardboard sheet(s). In one example, the first locking tab may align with an upper portion of the first aperture.

Similarly, the second locking floor panel is connected to the fourth floor panel by a second secondary fold line. A distal end of the second locking floor panel forms the second locking tab, as described above. The distance between the fourth fold line (connecting the fourth floor panel to the fourth side wall panel) and the second secondary fold line (connecting the second locking floor panel to the fourth floor panel) may be substantially equal to the distance between a base of the second locking tab and the second secondary fold line, such that the second locking tab can be inserted into the second aperture when the fourth floor panel is folded inward to a position perpendicular to the fourth side wall panel and the second locking floor panel is then folded upward and then outwardly to a position parallel to the fourth floor panel. In some embodiments, the fourth floor panel may extend under one or more of the first and third side panels and the second locking floor panel may extend over the one or more of the first and third side panels. Accordingly, the second secondary fold line may be a compound fold line, meaning that the second secondary fold line may have two closely spaced apart parallel fold lines, where the two fold lines are spaced apart by a distance that facilitates folding over the one or more of the first and third side panels. More specifically, if there is one thickness of cardboard to be received between the fourth floor panel and the second locking floor panel, then the distance between the two fold lines of the compound fold line is a function of the thickness of the one sheet of cardboard. Some embodiments may secure the first and third floor panels between the second floor panel and the first locking floor panel, yet if the first and third floor panels do not overlap then this is the equivalent of only one thickness of the cardboard. However, if there are overlapping cardboard sheets (i.e., multiple cardboard thicknesses) between the second floor panel and the first locking floor panel, then the distance between the two fold lines of the compound fold line should be adjusted as a function of the total thickness of cardboard received there between. Still further, the longitudinal dimension of the second aperture may also be adjusted to account for the number of cardboard thicknesses received between the fourth floor panel and the second locking floor panel so that the second locking tab will align with the second aperture after the second locking floor panel has been folded over the thickness of the cardboard sheet(s). In one example, the second locking tab may align with an upper portion of the second aperture.

Some embodiments may include various configurations that form feet to elevate the floor of the assembled chimney above a support surface. With the floor elevated above the support surface, a user may gain access to the central opening in the floor to ignite an accelerant that may be positioned in the central opening. Furthermore, elevating the floor above even a solid support surface allows air (i.e., oxygen) to flow below the floor and up through the central opening in order to support the spread of fire throughout a fuel source received or positioned within the assembled chimney. In some embodiments, for each pair of one side wall panel and one floor panel that are connected by a lateral fold line, the side wall panel and the floor panel are separated by a first slit extending inward and upward from a first edge of the side wall panel to a first end of the lateral fold line and a second slit extending inward and upward from a second edge of the side wall panel to a second end of the lateral fold line. Optionally, the first and second slits extend laterally inward from the respective edges of the side wall panel in a straight line to form part of a generally flat foot, before angling upward to an end of the lateral fold line. In a further option, the first and second slits extend laterally inward from the edge of the side wall panel in a straight line to form part of a generally flat foot that has sufficient length to span between adjacent wires of a common grill grate or sufficient length to be stable when set upon a rough surface, such as the ground or a further bed of cold charcoal or other source of solid fuel. The first and second slits are preferably mirror images of each other, and the first and second slits preferably have the same longitudinal and lateral dimensions and positioning in each wall panel and floor panel pair. It should be recognized that each of the floor panels are separated from each other by a longitudinal slit or slot, where a slit may be a mere cut separating adjacent floor panels from each other and a slot may involve dual cuts that result in the removal of a narrow strip of the cardboard from between adjacent floor panels. A slot may be preferred to avoid binding of the floor panels with the adjacent side wall panels as the floor panels are inwardly folded into a position that is perpendicular to the side wall panel to which it is connected. However, the longitudinal slot or slit that separates the floor panels should extend into communication with the first and second slits that form the feet. The embodiments described above may form a foot at each of four corners of the assembled chimney, with each foot having two perpendicular portions of cardboard that provide the foot with much greater strength than a single portion or sheet of cardboard lying in a single plane.

In some embodiments, the first locking floor panel and the second floor panel are separated along a pair of longitudinal slits in a distal end of the second floor panel, and wherein the second locking floor panel and the fourth floor panel are separated along a pair of longitudinal slits in a distal end of the fourth floor panel. In such a configuration, the second floor panel may extend on both sides of the first locking floor panel, and similarly the fourth floor panel may extend on both sides of the second locking floor panel. Accordingly, in the assembled chimney, the portions of the second and fourth floor panels that extend along the sides of the first and second locking floor panels, respectively, may provide further support for the first and third floor panels.

Some embodiments of the cardboard blank may further include grip flap apertures, which are flaps cut into one or more of the side wall panels and foldable to form an opening for a hand to grip the assembled chimney. For example, the cardboard blank may include a lateral fold line and a flap that is formed by cutting downward from one end of the fold line, cutting downward from the other end of the fold line, and cutting across between lower ends of the downward cuts. Each grip flap may be folded along the fold line and pushed through the grip flap aperture to form a comfortable handle to grip for carrying the assembled chimney whether empty or full of fuel. Optionally, the cardboard blank may include simple grip openings that are cut all around, such that there is no flap, or a perforated shape enabling the user option to punch out the cardboard within the perforations.

Some embodiments may include a plurality of holes, where each hole is formed through a side wall panel in a lower half of the side wall panel. The holes may serve as vents for the purpose of allowing a sufficient amount of air (i.e., oxygen) to support combustion of the fuel. The holes are preferably evenly distributed about the perimeter of the chimney, such as having two or three holes in each side wall panel. The holes should be large enough to support air flow into the chimney, yet small enough to retain the pieces of solid fuel disposed in the chimney until the fuel has been sufficiently ignited.

Some embodiments may further include an additional cardboard blank that may be used to form an insert or divider. The additional cardboard blank may be provided as a detached blank or as a blank attached to the cardboard blank that forms the chimney structure. If the insert blank is attached to the chimney blank, then intermittent slits (or perforations) are preferably provided to facilitate an end-user manually separating the insert blank from the chimney blank and/or separating multiple pieces of the insert without tools and without damage or unsightly tears. In some embodiments, an insert blank may include a first divider panel having a notch formed in a lower edge and a slot extending upward from the middle of the notch, and a second divider panel having a notch formed in a lower edge and a slot extending downward from an upper edge. An insert may be assembled by aligning the slot in the first divider panel with the slot in the second divider panel and interlocking the first and second divider panel with a portion of the first divider panel received in the slot of the second divider panel and a portion of the second divider panel received in the slot of the first divider panel.

Some embodiments provide a cardboard structure that is foldable to form a chimney. The cardboard structure comprises a first side wall panel, a second side wall panel connected to the first side wall panel by a first longitudinal fold line, a third side wall panel connected to the second side wall panel by a second longitudinal fold line, a fourth side wall panel connected to the third side wall panel by a third longitudinal fold line and connected to the first side wall panel by a fourth longitudinal fold line. The cardboard structure further comprises a first floor panel connected to the first side wall panel by a first lateral fold line, wherein the first floor panel has a cutout a spaced distance from the first lateral fold line; a second floor panel connected to the second side wall panel by a second lateral fold line, wherein the second side wall panel includes a first aperture above the second lateral fold line for receiving a first locking tab; a first locking floor panel connected to the second floor panel by a first secondary fold line, wherein the first locking floor panel has a distal end forming the first locking tab; a third floor panel connected to the third side wall panel by a third lateral fold line, wherein the third floor panel has a cutout a spaced distance from the third lateral fold line; a fourth floor panel connected to the fourth side wall panel by a fourth lateral fold line, wherein the fourth side wall panel includes a second aperture above the fourth lateral fold line for receiving a second locking tab; and a second locking floor panel connected to the fourth floor panel by a second secondary fold line, wherein the second locking floor panel has a distal end forming the second locking tab, and wherein a first connected pair of the side wall panels is laid generally flat against a second connected pair of the side wall panels.

Some embodiments of the cardboard structure may include any one or more embodiment of the cardboard blank disclosed above. Accordingly, the entire description of the cardboard blank will not be repeated in the context of the cardboard structure that is foldable to form a chimney. The primary distinction between the cardboard structure and the cardboard blank is that the side wall panels of the cardboard structure are already connected along both lateral sides of each side wall panel. By comparison, the cardboard blank has a wall attachment tab and a fourth side wall panel that are connectable but not yet connected. As a result, a related distinction is that the cardboard structure may have a first connected pair of the side wall panels that is laid generally flat against a second connected pair of the side wall panels. For example, first and second side wall panels may lay flat against third and fourth side wall panels, or second and third side wall panels may lay flat against fourth and first side wall panels. A wall attachment tab may be disposed between the first and second connected pairs of side wall panels, but this thickness is negligible and does not prevent the first and second connected pairs of side wall panels from being laid generally flat against each other, albeit not strictly in parallel planes. The cardboard structure may be folded in such a flat condition suitable for efficient shipping and storage. It is anticipated that multiple cardboard structures may be packaged and sold together in a flattened stack with or without any dividers. Some embodiments of the assembled cardboard chimney may be defined by four side wall panels, an open top, a floor extending inward from the side wall panels leaving a central opening in the floor, and a set of feet that elevate the floor.

In some embodiments of the cardboard structure, the chimney is capable of being assembled by the operations including: folding the first, second, third and fourth side wall panels into a continuous perimeter having a rectangular cross-sectional shape; folding the first and third floor panels inwardly to a lateral position with the side wall panels in a longitudinal position; folding the second and fourth floor panels inwardly to a lateral position under the first and third floor panels; folding the first and second locking floor panels to a lateral position over the first and third floor panels; securing the first locking tab into the first aperture; and securing the second locking tab into the second aperture. These operations are listed in a preferred order or sequence, but the embodiments are not limited to this order or sequence. Accordingly, the operations may describe one embodiment of a method of assembling a cardboard chimney from a cardboard blank as disclosed herein.

Embodiments of the cardboard structure may further include a divider, which may be one or more completely separate pieces of cardboard or one or more attached pieces of cardboard that are manually separable from the cardboard structure. The divider may be configured to be disposed between the four side wall panels of a cardboard chimney assembled using the cardboard structure. The divider may also extend upward from the floor of the chimney to form multiple compartments within the chimney. The compartments are preferably each sized to receive multiple pieces of a solid fuel, such as charcoal.

In some embodiments, the divider may include a first divider panel having a notch formed in a lower edge and a slot extending upward from the middle of the notch and a second divider panel having a notch formed in a lower edge and a slot extending downward from an upper edge. Optionally, a lower edge of the divider may have a notch that spans the central opening in the floor, wherein the central opening in the floor of the chimney and the notch in the divider provide a space for placing an accelerant, such as a waded or crumpled piece of paper or newspaper. The cardboard structure preferably enables the space for placing the accelerant to be accessible between the feet with a long reach butane lighter or match for igniting the accelerant. The space for placing the accelerant may also be open to the compartments for enabling a fire to spread from the accelerant to the pieces of a combustible material (i.e., fuel) disposed in the compartments. Suitable types of fuel may include, without limitation, charcoal pieces (i.e., lumps or briquettes), wood chips or other starter materials for barbeque grills or larger fires.

Some embodiments provide a kit for assembling a cardboard chimney. Such a kit may comprise a cardboard structure that is foldable to form a cardboard chimney according to any of the embodiments described herein, and a cardboard divider receivable within the perimeter of the assembled cardboard chimney according to any of the embodiments described herein. In one option, the kit may further comprise an accelerant, such as a flammable piece of paper suitable for wading and then placing the wadded paper into a central opening formed between the floor panels of the assembled cardboard chimney. One preferred accelerant is one or more sheet of newsprint, which is a non-archival paper consisting mainly of wood pulp. The newsprint may be printed or unprinted, but some embodiments may include instructions for folding the cardboard structure into a cardboard chimney, inserting the cardboard divider, positioning the accelerant, supplying the fuel and/or igniting the accelerant. Optionally, the newsprint may be printed with other useful, interesting, humorous or socially beneficial information.

Some embodiments of the kit may stack the components of the kit, such as a cardboard structure, divider and newsprint, and secure the components together. Optionally, any newsprint may be positioned between cardboard components and the cardboard components may be secured together, perhaps either by using a band, strap or sleeve, or by shrink wrapping with a plastic film. Multiple kits may be stacked, shipped, stored and/or sold together in a common package.

Some embodiments provide an apparatus comprising a cardboard chimney having a fully assembled configuration according to any of the embodiments disclosed herein. For example, the apparatus may comprise a cardboard chimney defined by four side wall panels, an open top, a floor extending inward from the side wall panels leaving a central opening in the floor, and a set of feet that elevate the floor. Optionally, the cardboard chimney may further include one or more dividers according to any of the embodiments disclosed herein, such as a divider forming multiple compartments within the space between the side wall panels. Furthermore, the fully assembled chimney may optionally include any one or more of features selected from handles formed into one or more of the four side wall panels and/or holes formed through a side wall panel in a lower half of the side wall panel. Still further, the fully assembled chimney may optionally include combustible material pieces (a solid fuel) disposed above the floor and between the four side wall panels, such as combustible material pieces disposed in multiple compartments formed by a divider, and/or an accelerant material, such as an accelerant material disposed within a notch formed in a lower edge of a divider. Even further, the apparatus could be provided as part of a kit that further includes an ignition source, such as one or more matches and a course striking surface.

Some embodiments of the apparatus may provide a fully assembled cardboard chimney that is collapsible into a flattened condition. However, other embodiments may provide a fully assembled cardboard chimney that is not collapsible. Non-collapsible cardboard chimney embodiments may be fully assembled during manufacturing and shipped without any assembly (i.e., folding) required. It should be recognized that such a fully assembled cardboard chimney may be defined by four side wall panels, an open top, a floor extending inward from the side wall panels leaving a central opening in the floor, and a set of feet that elevate the floor. Still, a fully assembled cardboard chimney may include adhesive connections between floor panels such that the locking floor panels may be eliminated and the other floor panels may require less cardboard material.

Figure 10:
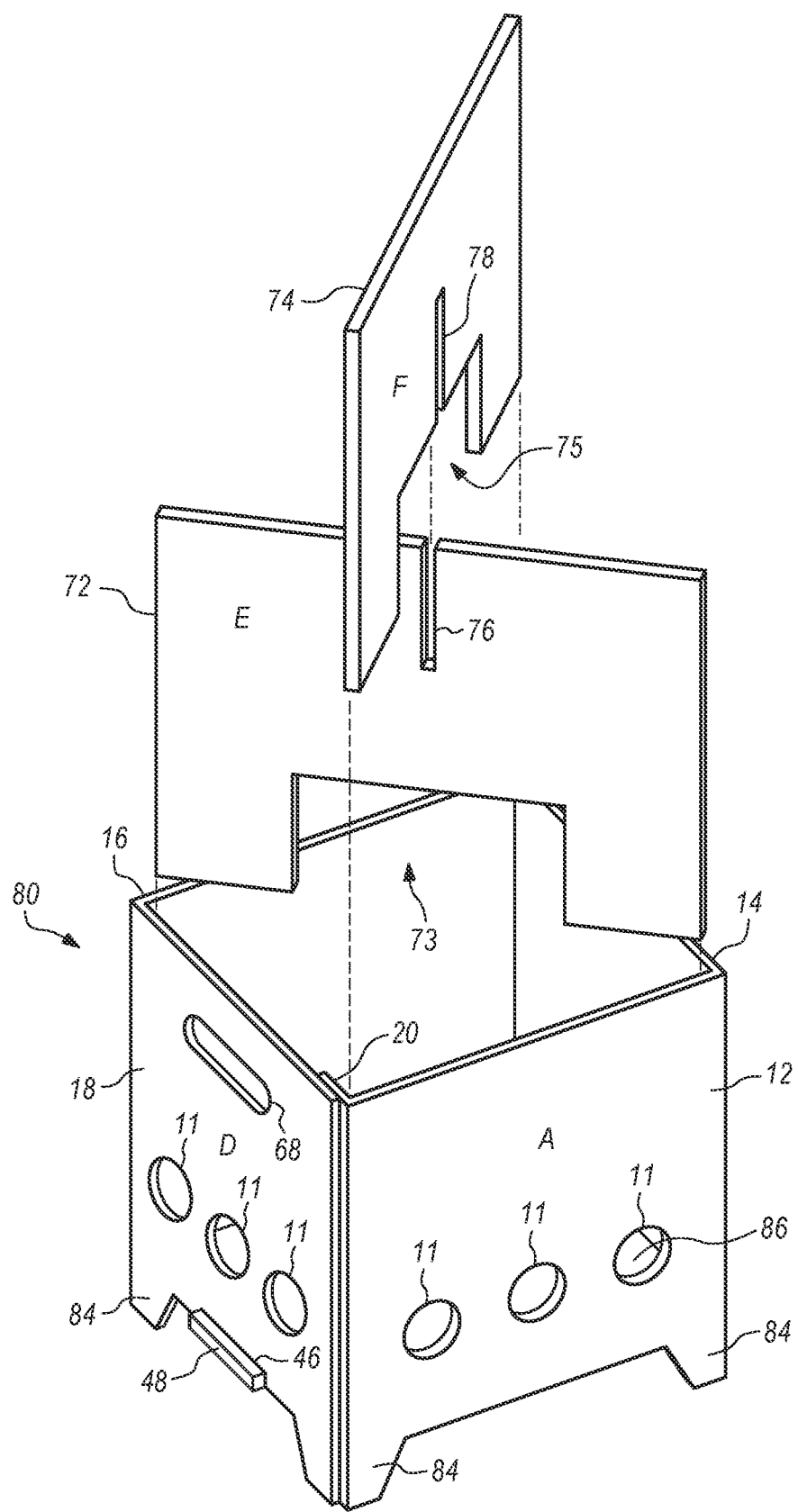
FIG. 10 is a perspective view of the assembled chimney with a set of dividers aligned for inserting into the assembled chimney.

FIG. 1 is a plan view of a cardboard blank 10 for forming a cardboard chimney (see FIG. 10). The cardboard blank 10 includes a first side wall panel 12 (panel "A"), a second side wall panel 14 (panel "B") connected to the first side wall panel 12 by a first longitudinal fold line 13, a third side wall panel 16 (panel "C") connected to the second side wall panel 14 by a second longitudinal fold line 15, a fourth side wall panel 18 (panel "D") connected to the third side wall panel 16 by a third longitudinal fold line 17, and a wall attachment tab 20 connected to the first side wall panel 12 by a fourth longitudinal fold line 19. The term "longitudinal" is used to refer to up and down directions as seen in FIG. 1 and the term "lateral" is used to refer to side-to-side directions as seen in FIG. 1.

The wall attachment tab 20 includes a surface area 21 that may be aligned with a surface area 22 (on the reverse side) of the fourth side wall panel 18 for connecting the wall attachment tab 20 and the fourth side wall panel 18. The surface area 21 of the wall attachment tab 20 and/or the surface area 22 (on the reverse side) of the fourth side wall panel 18 may include an adhesive protected by a manually removable release liner strip. The release liner strip should be removed before pressing the surface areas 21, 22 together to form a connection there between.

The cardboard blank 10 further comprises a first floor panel 22 connected to the first side wall panel 12 by a first lateral fold line 23, a second floor panel 24 connected to the second side wall panel 14 by a second lateral fold line 25, a third floor panel 26 connected to the third side wall panel 16 by a third lateral fold line 27, and a fourth floor panel 28 connected to the fourth side wall panel 18 by a fourth lateral fold line 29. The first floor panel 22 has a cutout 32 a spaced distance from the first lateral fold line 23, and the third floor panel 26 has a cutout 36 a spaced distance from the third lateral fold line 27. The size, shape and location of the cutouts 32, 36 are designed to create a square central opening in a floor of a chimney assembled from the cardboard blank 10.

The cardboard blank 10 also includes a first locking floor panel 34 connected to the second floor panel 24 by a first secondary fold line 35, wherein the first locking floor panel 34 has a distal end forming a first locking tab 44. Similarly, the cardboard blank 10 includes a second locking floor panel 38 connected to the fourth floor panel 28 by a second secondary fold line 39, wherein the second locking floor panel 38 has a distal end forming a second locking tab 48. The second side wall panel 14 includes a first aperture 42 above the second lateral fold line 25 for receiving the first locking tab 44, and the fourth side wall panel 18 includes a second aperture 46 above the fourth lateral fold line 29 for receiving the second locking tab 48. The first and second secondary fold lines 35, 39 are shown as compound fold lines, which will fold along two lines that are closely spaced together. In the embodiment shown, the first and second locking floor panels 34, 38 will fold over the top of the first and second floor panels 22, 26.

Each of the side wall panels 12, 14, 16, 18 are partially separated from a corresponding one of the floor panels 22, 24, 26, 28 by a first slit 52 extending inward and upward from a first edge of each side wall panel 12, 14, 16, 18 to a first end of the respective lateral fold line 23, 25, 27, 29 and a second slit 54 extending inward and upward from a second edge of each side wall panel 12, 14, 16, 18 to a second end of the respective lateral fold line 23, 25, 27, 29. As shown, the first and second slits 52, 54 extend laterally inward from the edge of the side wall panel in a straight line to form part of a generally flat foot, before angling upward to an end of the lateral fold line.

Furthermore, each of the floor panels 22, 24, 26, 28 are separated from each other by a longitudinal slot 62, 64, 66, which prevents binding of the floor panels with the adjacent side wall panels as the floor panels are inwardly folded into a position that is perpendicular to the side wall panel to which it is connected. Since the longitudinal slots 62, 64, 66 extend into communication with the first and second slits that form the feet, the floor panel is free to be folded along the lateral fold line. This will leave a foot at each of four corners of the assembled chimney.

The first locking floor panel 34 and the second floor panel 24 are separated along a pair of longitudinal slits 43, 45 in a distal end of the second floor panel 24, and the second locking floor panel 38 and the fourth floor panel 28 are separated along a pair of longitudinal slits 47, 49 in a distal end of the fourth floor panel 28. Accordingly, the second floor panel 24 may extend on both sides of the first locking floor panel 34, and the fourth floor panel 28 may extend on both sides of the second locking floor panel 38.

The cardboard blank 10 further includes handles 60, 68. The particular handle shown is a grip flap including an upper lateral fold line and a flap that is formed by cutting downward from one end of the fold line, cutting downward from the other end of the fold line, and cutting across between lower ends of the downward cuts. Each grip flap may be folded along the fold line and pushed through the grip flap aperture to form a comfortable handle to grip for carrying the assembled chimney whether empty or full of fuel.

A plurality of holes 11 are formed through each side wall panel 12, 14, 16, 18 in a lower half of the side wall panel (i.e., just above the lateral fold lines 23, 25, 27, 29). The holes 11 serve as vents allowing a sufficient amount of air (i.e., oxygen) to flow through the holes to support combustion of a fuel, yet retain the pieces of solid fuel that may be disposed in the chimney.

Figure 2:
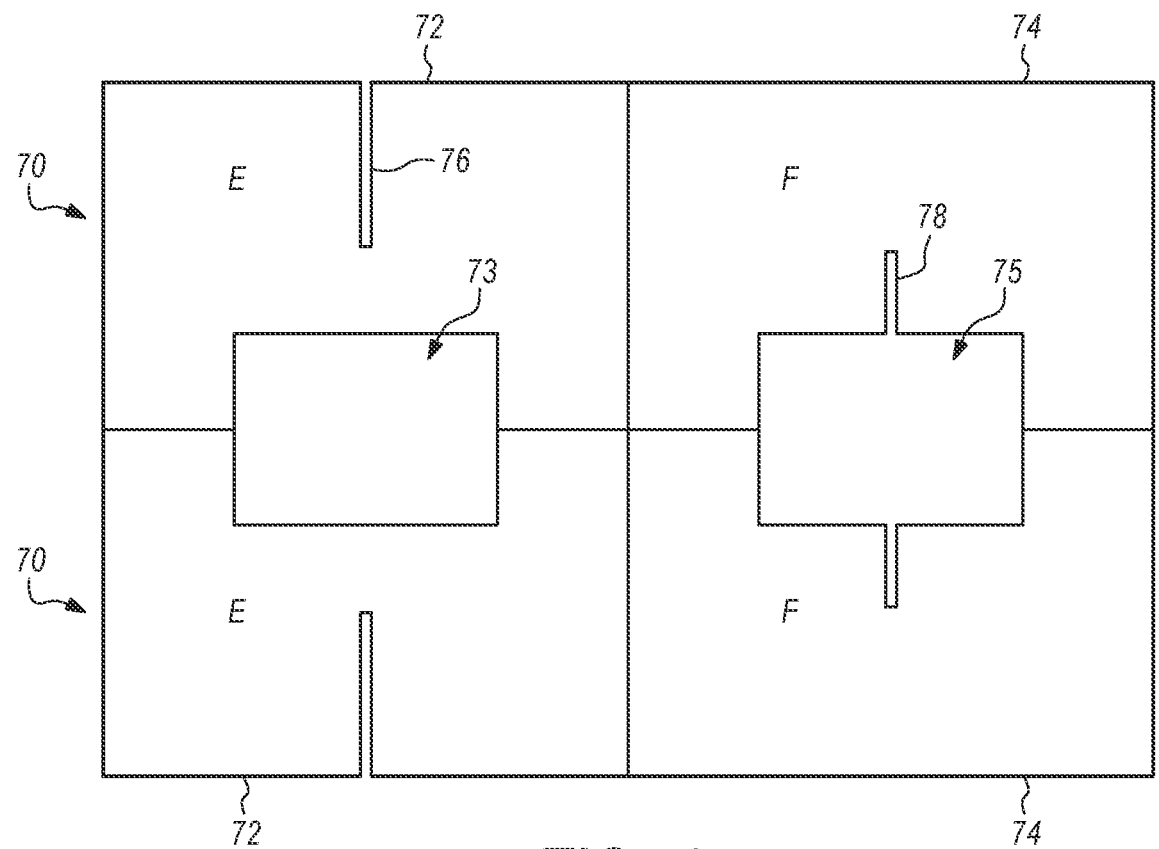
FIG. 2 is a plan view of two sets of divider blanks.

FIG. 2 is a plan view of two sets of blanks 70 for forming an insert or divider. Each blank 70 includes a first divider wall 72 (panel "E") and a second divider wall 74 (panel "F"). Each first divider panel 72 has a rectangular notch 73 formed in a lower edge and a slot 76 extending longitudinally downward from an upper edge. Note that the lower edge is defined as the edge with the notch 73 formed therein, since this is the edge that will be downward directed when installed in the chimney. The second divider panel 74 has a notch 75 formed in a lower edge and a slot 78 extending longitudinally upward from the middle of the notch 75. An insert or divider assembly may be assembled by aligning the slot 76 in the first divider panel 72 with the slot 78 in the second divider panel 74 and interlocking the first and second divider panels 72, 74 with a portion of the first divider panel 72 received in the slot 78 of the second divider panel 74 and a portion of the second divider panel 74 received in the slot 76 of the first divider panel 72 (see FIGS. 10 and 12). The lower blank 70 is shown as a mirror image of the upper blank 70 and may be identical in form and use.

Figure 3:
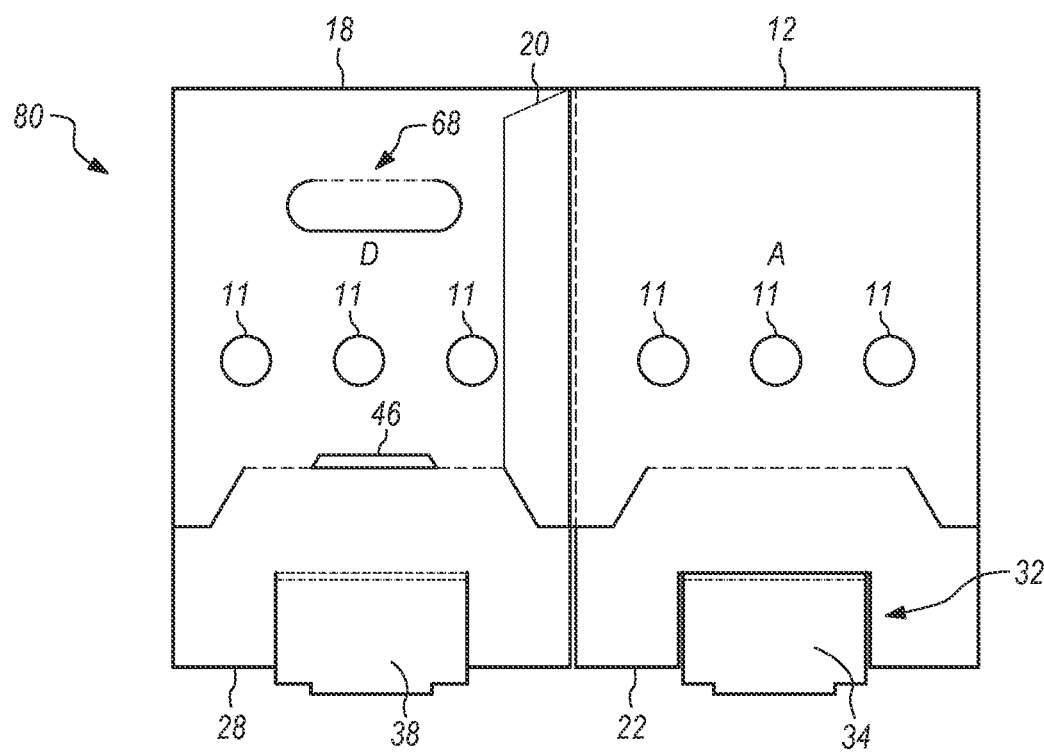
FIG. 3 is a plan view of a glued and unfolded cardboard structure suitable for shipping and storage according to one embodiment.

FIG. 3 is a plan view of a cardboard structure 80 suitable for shipping and storage, and foldable to form a chimney. The cardboard structure 80 is shown with the first and fourth side wall panels 12, 18 face up and laying on top of the second and third side wall panels 14, 16 (not shown). The second and third side wall panels 14, 16 (not shown) are substantially hidden from view, with only a reverse side of the first locking floor panel 34 being clearly seen where the cutout 32 is formed in the first floor panel 22.

This plan view further illustrates the wall attachment tab 20 overlapping with an edge portion of the fourth side wall panel 18 to form a secure connection there between with adhesive. The wall attachment tab 20 is positioned behind the fourth side wall panel 18 for both aesthetic and structural reasons. For example, placing the wall attachment tab 20 behind the fourth side wall panel 18 may protect the wall attachment tab 20 from being pulled away and may provide some additional spacing so that the floor panel 22 does not bind when folded into a lateral position.

Other elements of the cardboard blank 10 of FIG. 1 are also shown and labeled with like reference numbers to emphasize how the cardboard structure 80 is formed from the cardboard blank 10 by partial folding and adhering of the wall attachment tab 20 to the fourth side wall panel 18. The cardboard structure 80 could also be flattened with the first and second wall panels laid against the third and fourth wall panels, such that the only difference would be the position of the wall attachment tab and the positions of the locking floor panels.

FIGS. 4-9 are top views of the cardboard structure 80 of FIG. 3 through a sequence of folds to assemble the cardboard chimney for use.

Figure 4:
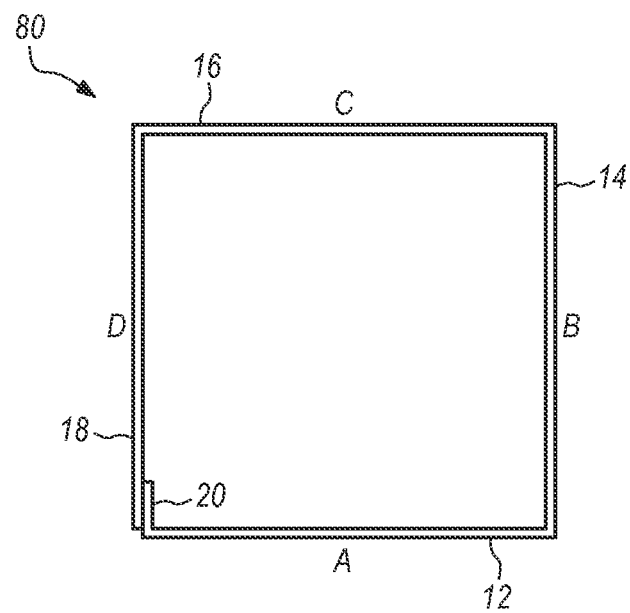
FIGS. 4-9 are top views of the cardboard structure of FIG. 3 through a sequence of folds to assemble the chimney for use.

FIG. 4 is a top view of the cardboard structure 80 that has been folded so that the first, second, third and fourth side wall panels 12, 14, 16, 18 form a continuous perimeter having a rectangular (square) cross-sectional shape. Furthermore, the wall attachment tab 20 is shown connected with an adhesive to the fourth side wall panel 18. The region between the side wall panels is presently open, but will be used as the cardboard structure 80 is further folded.

Figure 5:
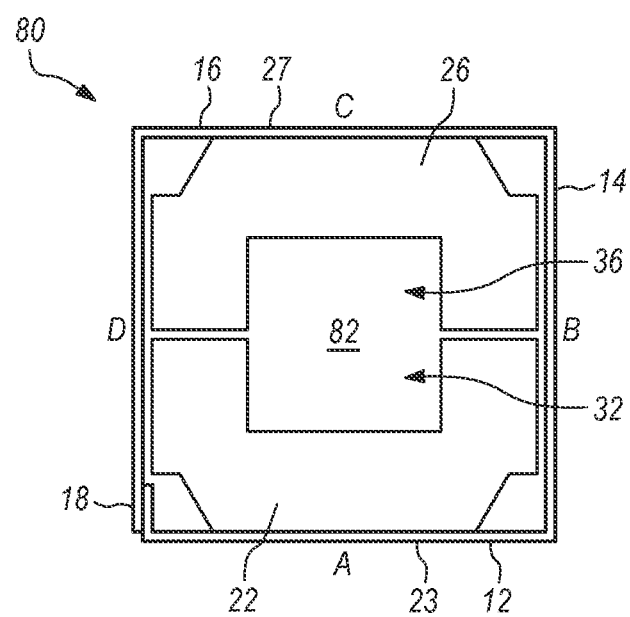

FIG. 5 is a top view of the cardboard structure 80 of FIG. 4 after inwardly folding the first and third floor panels 22, 26 about their respective lateral fold lines 23, 27 to a lateral position (shown here in the plane of the page) with the side wall panels 12, 14, 16, 18 each a longitudinal position (shown here extending from the page). In this position, the first and third floor panels 22, 26 extend toward each other with only a small gap remaining between them. Accordingly, the first and third floor panels 22, 26 define a floor extending around the inside perimeter edge of the square formed by the side wall panels 12, 14, 16, 18. The cutouts 32, 36 formed in the first and third floor panels 22, 26 now define a central opening 82 in the floor of the cardboard structure 80. Note that the first and third floor panels 22, 26 are not yet secured in position and are not yet able to support solid fuel within the chimney.

Figure 6:
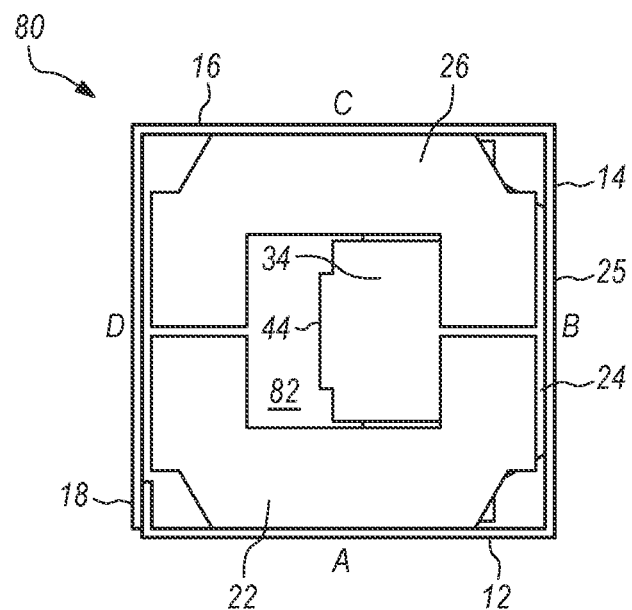

FIG. 6 is a top view of the cardboard structure 80 of FIG. 5 after inwardly folding the second floor panel 24 about its lateral fold line 25 to a lateral position under portions of the first and third floor panels 22, 26. As a result, the first locking floor panel 34 and the first locking tab 44 are seen through the central opening 82.

Figure 7:
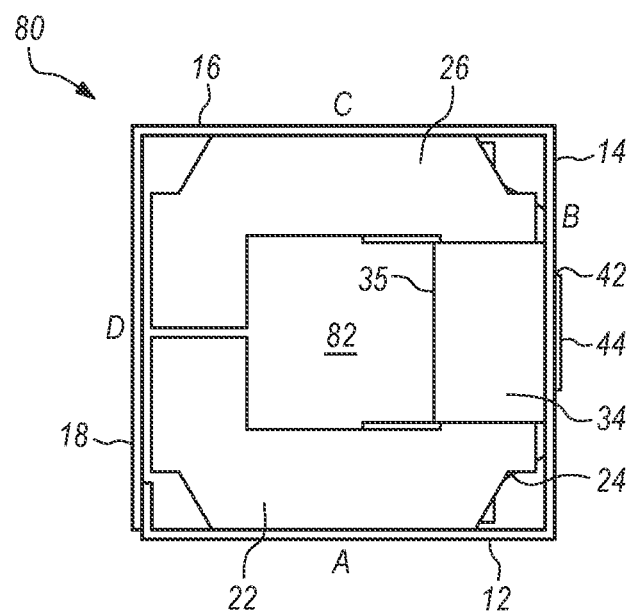

FIG. 7 is a top view of the cardboard structure 80 of FIG. 6 after upwardly (out of the page) and outwardly (to the right) folding the first locking floor panel 34 about the first secondary fold line 35 to a lateral position over the top of the side of the first and third floor panels 22, 26. In this position, the first locking tab 44 is secured into the first aperture 42. As a result, the first and third floor panels 22, 26 are securely held between the portions of the second floor panel 24 and the first locking floor panel 34.

Notice that since the first and third floor panels 22, 26 do not overlap, there is only one thickness of cardboard between the second floor panel 24 and the first locking floor panel 34. Accordingly, the first secondary fold line 35 is a compound fold line that folds along two parallel lines that are spaced apart at a distance of about one thickness of cardboard.

Figure 8:
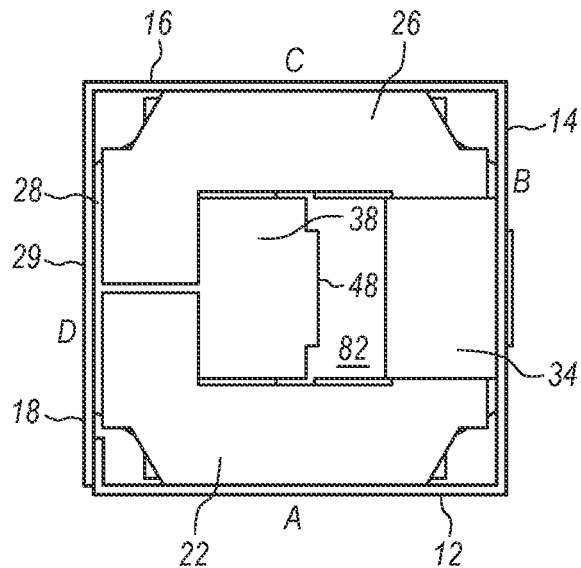

FIG. 8 is a top view of the cardboard structure 80 of FIG. 7 after inwardly folding the fourth floor panel 28 about its lateral fold line 29 to a lateral position under portions of the first and third floor panels 22, 26. As a result, the second locking floor panel 38 and the second locking tab 48 are seen through the central opening 82.

Figure 9:
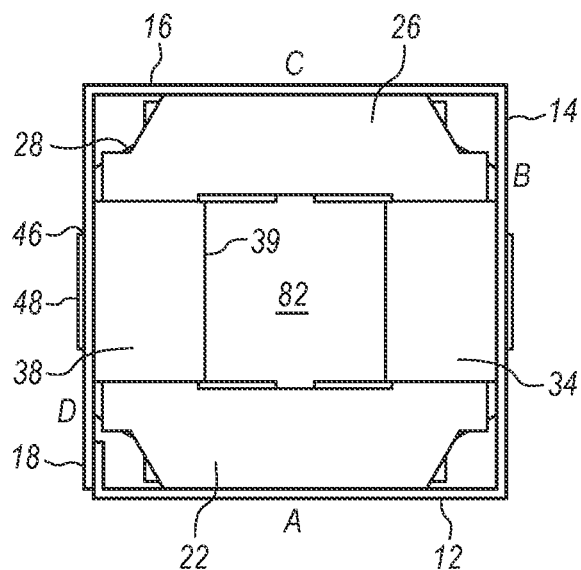

FIG. 9 is a top view of the cardboard structure 80 of FIG. 8 after upwardly (out of the page) and outwardly (to the left) folding the second locking floor panel 38 about the second secondary fold line 39 to a lateral position over the top of the side of the first and third floor panels 22, 26. In this position, the second locking tab 48 is secured into the second aperture 46. As a result, the first and third floor panels 22, 26 are securely held between the portions of the fourth floor panel 28 and the second locking floor panel 38. Note that the first and third floor panels 22, 26 are now secured to opposing sides and are supported from multiple side wall panels. This completes the assembly of the chimney floor.

Notice that since the first and third floor panels 22, 26 do not overlap, there is only one thickness of cardboard between the fourth floor panel 28 and the second locking floor panel 38. Accordingly, the second secondary fold line 39 is a compound fold line that folds along two parallel lines that are spaced apart at a distance of about one thickness of cardboard.

FIG. 10 is a perspective view of the assembled cardboard chimney 80 with dividers 72, 74 aligned for inserting into the open top of the cardboard chimney. The first divider panel 72 has a notch 73 formed in a lower edge and a upwardly open slot 76 extending downward from an upper edge of the first divider panel 72, and a second divider panel 74 having a notch 75 formed in a lower edge of the second divider panel 74 and a downwardly open slot 75 extending upward from the middle of the notch 75. An insert assembly may be assembled by aligning the slot 76 in the first divider panel 72 with the slot 78 in the second divider panel 74 and interlocking the first and second divider panels 72, 74 by lowering the second divider panel 74 so that a portion of the first divider panel 72 is received in the slot 78 of the second divider panel 74 and a portion of the second divider panel 74 is received in the slot 76 of the first divider panel 72. The two divider panels 72, 74 then form an X-shape divider assembly with lateral edges that fit into the internal corners of the space formed between the side wall panels 12, 14, 16, 18 (see FIG. 12). While the notches 75, 76 may span across the central opening 82 (see FIG. 11) the remaining lower edge of the dividers 72, 74 will rest on the floor formed by the floor panels.

After folding the floor panels into the lateral positions of the assembled chimney as shown in FIG. 9, the remaining lower portions of the side wall panels 12, 14, 16, 18 are left to form four feet 84 in the corners of the assembled chimney 80. The feet 84 elevate the floor 86 (see also FIG. 11) of the assembled chimney 80 above a support surface.

Figure 11:
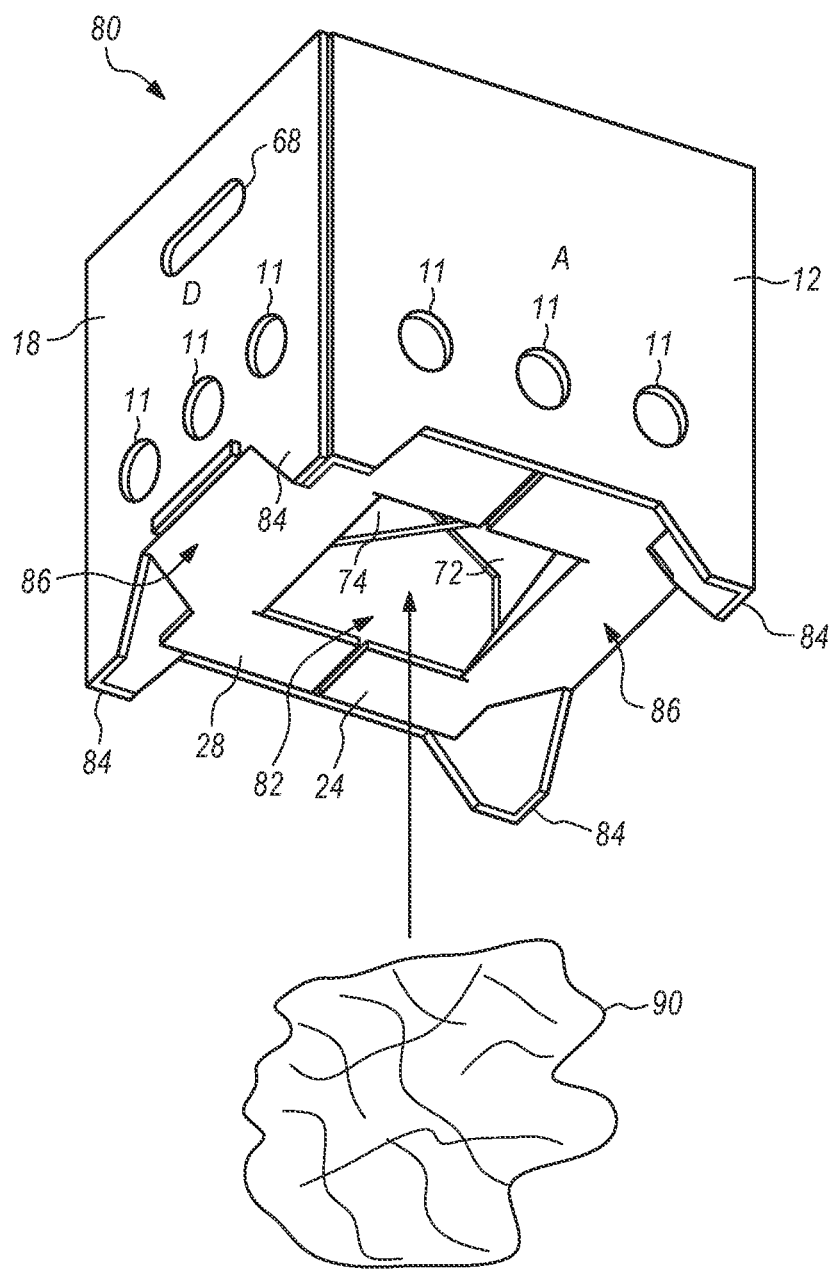
FIG. 11 is a bottom perspective view of the assembled chimney showing a space for receiving an accelerant.

FIG. 11 is a bottom perspective view of the assembled chimney 80 showing a space between the central opening 82 and the notches 75, 76 (see FIG. 10) formed in the dividers 72, 74 for receiving an accelerant, such as a wad of newsprint 90. In this bottom perspective view, the bottom surface of the floor 86 can be clearly seen, as well as the central opening 82 formed in the floor 86. In addition, the structure of the four feet 84 are clearly shown, illustrating the two sides of each foot 84 that extend at right angles to each other and impart substantial rigidity and strength.

Figure 12:
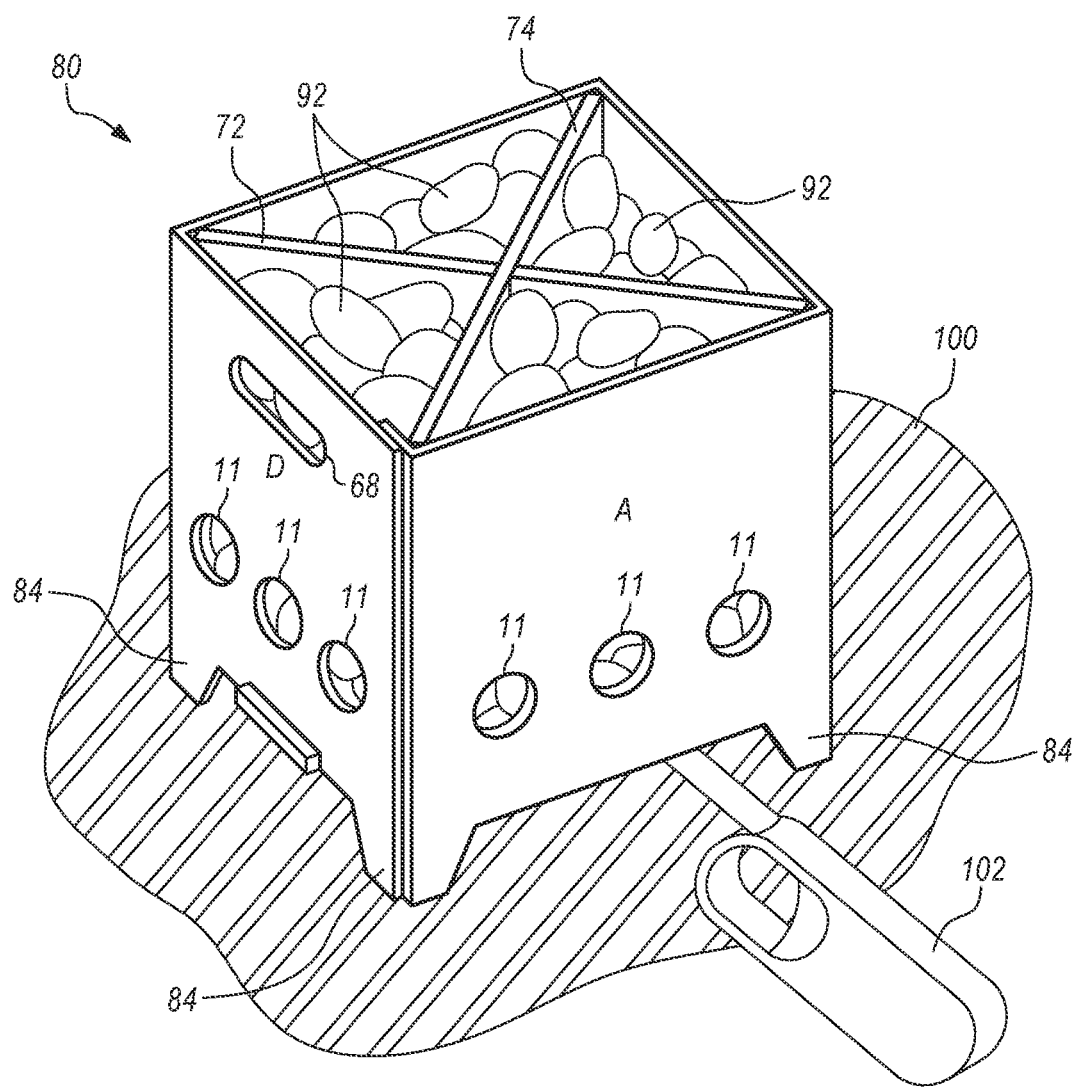
FIG. 12 is a top perspective view of the assembled cardboard chimney set on a cooking grill with charcoal in the compartments and ready to be lit.

FIG. 12 is a top perspective view of the assembled chimney 80 on a grate 100 of a cooking grill with charcoal 92 received in the compartments formed by the dividers 72, 74. With the newsprint 90 (shown in FIG. 11) in place near the bottom of the charcoal 92, an ignition source may be used to ignite the newsprint. Specifically, the feet 84 (only three of four shown) elevate the floor 86 (see FIG. 11) above the grate 100 so that a user may gain access to the central opening in the floor to ignite the newsprint. For example, a long reach butane lighter 102 is shown in position to ignite the newsprint.

As the newsprint 90 burns, the fire spreads to the charcoal 92 as well as the cardboard dividers 72, 74 and eventually to the entirety of the cardboard chimney 80. Sufficient air (i.e., oxygen) to support the fire may flow between the feet 84 and up through the central opening in the floor, as well as through the holes 11 in the side wall panels.

The cardboard chimney 80 enables reliable and quick creation of a fire suitable for grilling on an outdoor barbeque grill or starting a larger fire of other materials for indoor or outdoor fires. The cardboard chimney ignites reliably and may produce a usable fire for cooking in a shorter amount of time than a traditional metal fire-starting chimney. The internal dividers hold the charcoal or other material in place and may be the last part of the first starter to burn, thus spreading the fire among the more centrally located charcoal after the side wall panels have burned away. The cardboard chimney may be sized to hold a suitable amount of charcoal or wood to produce the optimal sized fire for cooking or accelerating a larger fire.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A cardboard blank for forming a chimney, comprising:
 a first side wall panel;
 a second side wall panel connected to the first side wall panel by a first longitudinal fold line;
 a third side wall panel connected to the second side wall panel by a second longitudinal fold line;
 a fourth side wall panel connected to the third side wall panel by a third longitudinal fold line;
 a wall attachment tab connected to a selected one the first and fourth side wall panels by a fourth longitudinal fold line, wherein the wall attachment tab is connectable to the other of the first and fourth side wall panels;
 a first floor panel connected to the first side wall panel by a first lateral fold line, wherein the first floor panel has a cutout a spaced distance from the first lateral fold line;
 a second floor panel connected to the second side wall panel by a second lateral fold line, wherein the second floor panel includes a first aperture above the second lateral fold line for receiving a first locking tab;
 a first locking floor panel connected to the second floor panel by a first secondary fold line, and wherein the first locking floor panel has a distal end forming the first locking tab;
 a third floor panel connected to the third side wall panel by a third lateral fold line, wherein the third floor panel has a cutout a spaced distance from the third lateral fold line;
 a fourth floor panel connected to the fourth side wall panel by a fourth lateral fold line, wherein the fourth floor panel includes a second aperture above the fourth lateral fold line for receiving a second locking tab; and
 a second locking floor panel connected to the fourth floor panel by a second secondary fold line, wherein the second locking floor panel has a distal end forming the second locking tab.

2. The flat cardboard blank of claim 1, wherein, for each of the side wall panels and floor panels that are connected by a lateral fold line, the side wall panel and the floor panel are separated by a first slit extending inward and upward from a first edge of the side wall panel to a first end of the lateral fold line and a second slit extending inward and upward from a second edge of the side wall panel to a second end of the lateral fold line.

3. The flat cardboard blank of claim 1, wherein the first locking floor panel and the second floor panel are separated along a pair of longitudinal slits in a distal end of the second floor panel, and wherein the second locking floor panel and the fourth floor panel are separated along a pair of longitudinal slits in a distal end of the fourth floor panel.

4. The flat cardboard blank of claim 1, further comprising:
 a first divider panel having a notch formed in a lower edge and a slot extending upward from the middle of the notch; and
 a second divider panel having a notch formed in a lower edge and a slot extending downward from an upper edge.

5. The flat cardboard blank of claim 1, further comprising:
 a plurality of holes, each hole formed through a side wall panel in a lower half of the side wall panel.

6. The flat cardboard blank of claim 1, further comprising:
 an adhesive strip covered by a release liner strip, wherein the adhesive strip is applied to the wall tab and/or the fourth side wall panel for securing the wall tab to the fourth side wall panel.

7. The flat cardboard blank of claim 1, wherein the fourth wall includes at least one slit for securely receiving at least one portion of the tab.

8. The flat cardboard blank of claim 1, wherein the cardboard is combustible and substantially free from chemical additives.

9. A cardboard structure that is foldable to form a chimney, comprising:
 a first side wall panel;
 a second side wall panel connected to the first side wall panel by a first longitudinal fold line;
 a third side wall panel connected to the second side wall panel by a second longitudinal fold line;
 a fourth side wall panel connected to the third side wall panel by a third longitudinal fold line and connected to the first side wall panel by a fourth longitudinal fold line;
 a first floor panel connected to the first side wall panel by a first lateral fold line, wherein the first floor panel has a cutout a spaced distance from the first lateral fold line;
 a second floor panel connected to the second side wall panel by a second lateral fold line, wherein the second floor panel includes a first aperture above the second lateral fold line for receiving a first locking tab;
 a first locking floor panel connected to the second floor panel by a first secondary fold line, and wherein the first locking floor panel has a distal end forming the first locking tab;
 a third floor panel connected to the third side wall panel by a third lateral fold line, wherein the third floor panel has a cutout a spaced distance from the third lateral fold line;
 a fourth floor panel connected to the fourth side wall panel by a fourth lateral fold line, wherein the fourth floor panel includes a second aperture above the fourth lateral fold line for receiving a second locking tab; and
 a second locking floor panel connected to the fourth floor panel by a second secondary fold line, wherein the second locking floor panel has a distal end forming the second locking tab, and wherein a first connected pair of the side wall panels is laid generally flat against a second connected pair of the side wall panels.

10. The cardboard structure of claim 9, wherein, for each of the side wall panels and floor panels that are connected by a lateral fold line, the side wall panel and the first floor panel are separated by a first slit extending inward and upward from a first edge of the side wall panel to a first end of the lateral fold line and a second slit extending inward and upward from a second edge of the side wall panel to a second end of the lateral fold line.

11. The cardboard structure of claim 10, wherein the chimney is defined by four side wall panels, an open top, a floor extending inward from the side wall panels leaving a central opening in the floor, and a set of feet that elevate the floor.

12. The cardboard structure of claim 9, wherein the chimney is configured for being assembled by the operations including:
- folding the first, second, third and fourth side wall panels into a continuous perimeter having a rectangular cross-sectional shape;
- folding the first and third floor panels inwardly to a lateral position with the side wall panels in a longitudinal position;
- folding the second and fourth floor panels inwardly to a lateral position under the first and third floor panels;
- folding the first and second locking floor panels to a lateral position over the first and third floor panels;
- securing the first locking tab into the first aperture; and
- securing the second locking tab into the second aperture.

13. The cardboard structure of claim 12, further comprising:
- a divider disposed between the four side wall panels and extending upward from the floor to form multiple compartments.

14. The cardboard structure of claim 13, wherein the divider includes:
- a first divider panel having a notch formed in a lower edge and a slot extending upward from the middle of the notch; and
- a second divider panel having a notch formed in a lower edge and a slot extending downward from an upper edge.

15. The cardboard structure of claim 13, wherein a lower edge of the divider has a notch that spans the central opening in the floor, wherein the central opening in the floor of the chimney and the notch in the divider provide a space for placing an accelerant.

16. The cardboard structure of claim 15, wherein the space for placing the accelerant is accessible between the feet with a long reach butane lighter or match for igniting the accelerant, and wherein the space for placing the accelerant is open to the compartments for enabling a fire to spread from the accelerant to the pieces of a combustible material disposed in the compartments.

17. The cardboard structure of claim 9, further comprising:
- a plurality of holes, each hole formed through an independently selected one or more of the side wall panels in a lower half of the selected side wall panel.

18. The cardboard structure of claim 9, wherein the chimney is fully combustible.

19. A kit for assembling a cardboard chimney, comprising:
- the cardboard structure of claim 9; and
- a cardboard divider receivable within a perimeter of the assembled chimney.

20. The kit of claim 19, further comprising:
- a flammable piece of paper suitable for wading and placing the waded paper into a central opening between the floor panels of the assembled chimney.

\* \* \* \* \*